May 3, 1955　　　　　　A. SKROBISCH　　　　　2,707,334
VIBRATOR GAUGE

Filed July 22, 1952　　　　　　　　　　　　　　2 Sheets-Sheet 1

INVENTOR
ALFRED SKROBISCH
BY James and Franklin
ATTORNEY

May 3, 1955    A. SKROBISCH    2,707,334
VIBRATOR GAUGE
Filed July 22, 1952    2 Sheets-Sheet 2
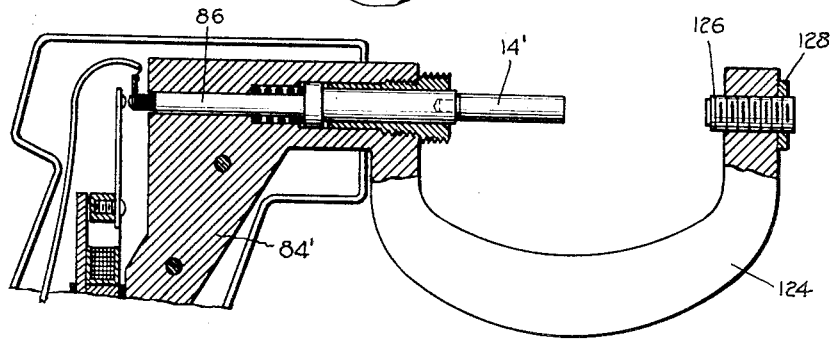
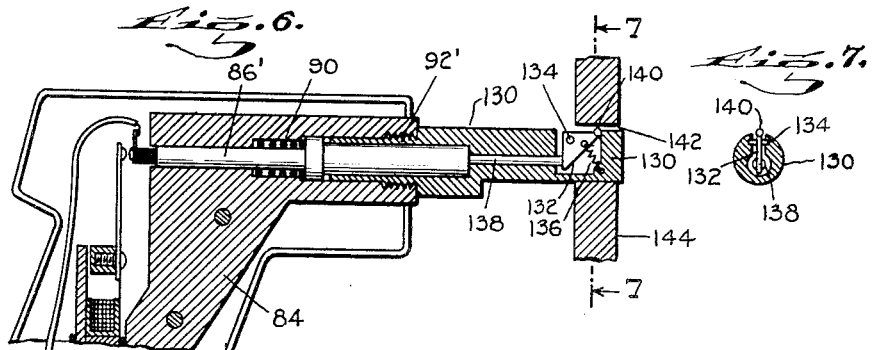
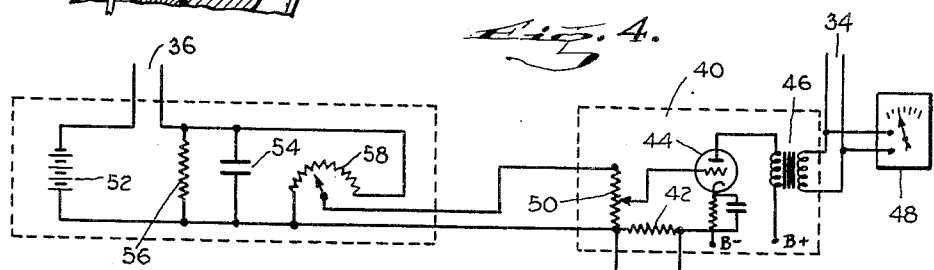
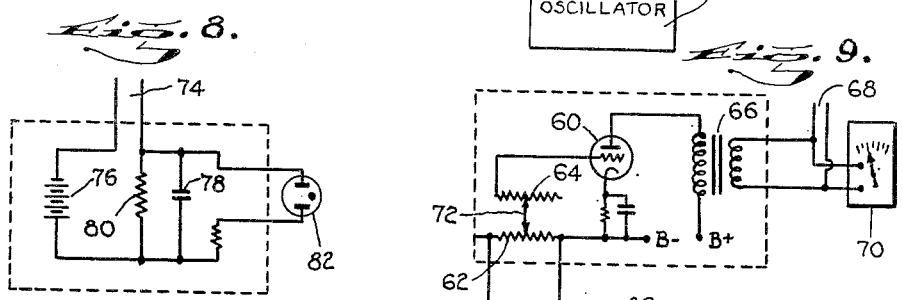
INVENTOR
ALFRED SKROBISCH
BY
James and Franklin
ATTORNEY

United States Patent Office 2,707,334
Patented May 3, 1955

2,707,334

VIBRATOR GAUGE

Alfred Skrobisch, New York, N. Y., assignor to Allard Instrument Corp., New York, N. Y., a corporation of New York Application July 22, 1952, Serial No. 300,249

9 Claims. (Cl. 33—172)

This invention relates to gauges for the measurement of depth, diameter, or other such measure.

The primary object of my invention is to generally improve measuring devices or gauges, particulary for precision measurement.

A more particular object is to make it possible to measure minute differences in dimension with great accuracy, and to indicate the result of the measurement by a clear indication on a large meter, lamp, or other indicator suitable for use by relatively unskilled operators.

In accordance with further features and objects of the invention, the apparatus is usable as a go and no-go gauge, or may be used to actually measure the deviation from a desired measurement, in small increments, typically 0.0001", so that the pieces being measured may be assorted into bins according to their dimension.

To accomplish the foregoing general objects, and other more specific objects which will hereinafter appear, my invention resides in the vibrator gauge elements, and their relation one to another as are hereinafter more particularly described in the following specification. The specification is accompanied by drawings, in which:

Fig. 4 is a schematic wiring diagram explanatory of the automatic circuit associated with the gauge;

Fig. 5 is a partially sectioned side elevation showing a modification adapted for outside measurement, such as outside diameter;

Fig. 6 is a similar view showing a modification adapted for inside measurement, such as inside diameter;

Fig. 7 is a fragmentary section taken approximately in the plane of the line 7—7 of Fig. 6;

Fig. 8 is a schematic wiring diagram showing an indicator circuit for manual operation; and Fig. 9 is a schematic wiring diagram showing a supply circuit for manual operation.

Figure 1:
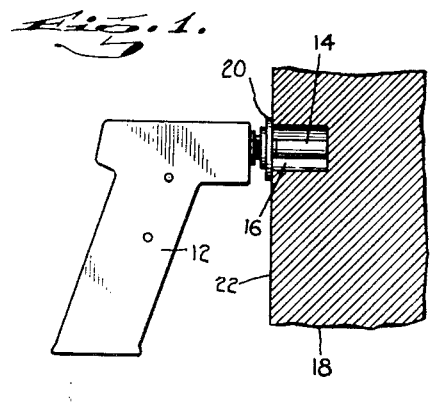
Fig. 1 shows one form of gauge embodying my invention, used as a depth gauge.

Referring to the drawing, and more particularly to Fig. 1, I there show the invention used as a depth gauge. For convenience it is preferably embodied in pistol-grip form, as shown at 12, and has a rod or feeler 14 which is suitably dimensioned to test the depth of a hole 16 in a work piece 18. A flange or stop disc 20 is intended to bear against the surface 22 of the work piece 18, and in operation the rod or feeler 14 is inserted in the hole 16 and pushed all the way by pistol-grip 12.

Figure 2:
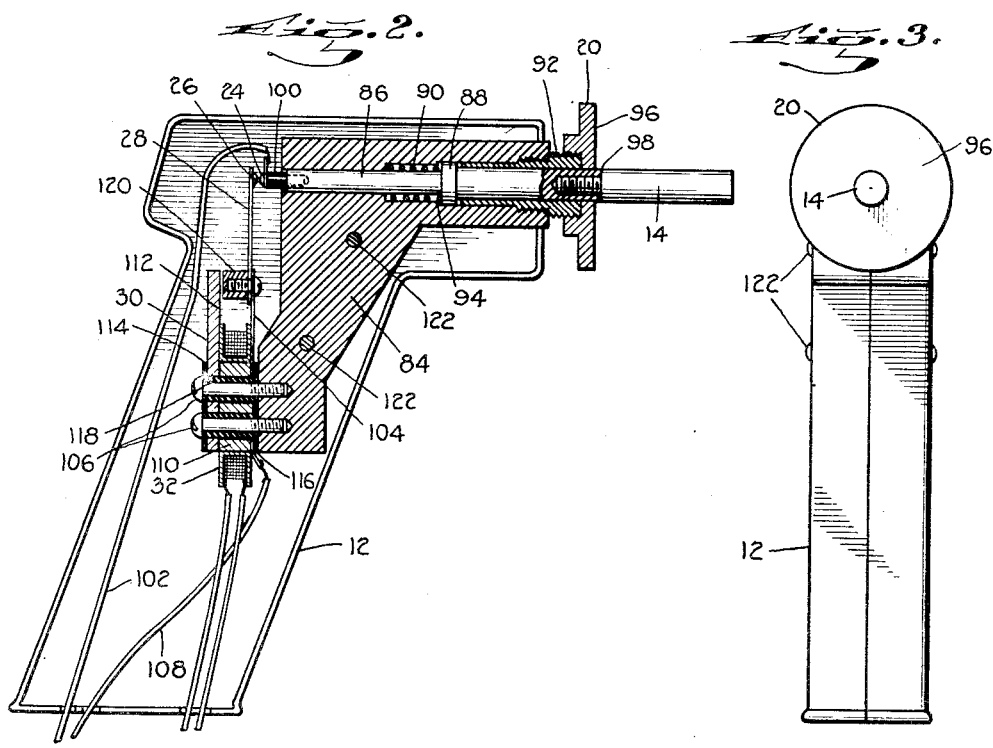
Fig. 2 is a section through the gauge shown in Fig. 1.

Referring now to Fig. 2, the rod 14 carries a non-vibratable contact 24. This cooperates with a vibratable contact 26 carried on a reed 28. This is vibrated by means of an electro magnet 30 having a magnet coil 32. With the reed 28 in vibration a pre-determined amount, the engagement or non-engagement of the contacts 24 and 26, and more precisely, the duration of the increments of contact, may be used as a measure of the position of the feeler rod 14. Much of the benefit of the invention arises from the fact that the coil 32 preferably is energized by alternating current having a frequency in resonance with (one-half of) the natural resonance frequency of the reed 28. For convenience I shall refer to the alternating frequency being equal to the natural resonance frequency of the reed, but it will be understood that when the magnet circuit is non-polarized, as here illustrated, the negative half cycles as well as the positive half cycles attract the reed, and therefore the alternating current frequency as usually measured in terms of full cycles should be one-half the natural frequency of the reed. If the magnetic circuit were suitably polarized the alternating current frequency would equal the resonant frequency of the reed.

If it be assumed that the coil 32 is energized with enough current from a suitable oscillator to cause engagement of contacts 24 and 26 for a particular desired position of the rod or feeler 14, any change in the position of the rod will result in a different current being required to bring about the same amount of engagement at the contacts 24 and 26. In accordance with my invention a circuit is established through the contacts and the resulting current flow is used as a bias control to limit and change the output from the oscillator which is energizing the magnet coil 32. In other words, an electronic servo-system is set up to automatically control the extent of engagement between the contacts 24 and 26 regardless (within limits) of the position of the rod 14.

The amplitude of vibration of the reed depends upon the ampere-turns energization of the coil, and inasmuch as the number of turns is fixed, the amplitude depends on current. Because the frequency is constant (to match the particular reed used in the instrument) the current flow through the coil varies as the potential across the coil. Thus the energization of the coil may be measured by means of a voltmeter across the coil, as well as by an ammeter in series with the coil, but the voltmeter when so used is making what is in effect a current measurement.

I have found that the arrangement of Fig. 2 will give such precise control that the voltmeter will show up differences in voltage required for minute changes in the position of the rod 14 to measurement values of, say, 0.0001".

Referring now to Fig. 4 of the drawing, the magnet coil is connected to and energized through the wires 34, while the contacts are connected to the wires 36. The alternating current for the magnet coil is supplied from an oscillator 38. This may be a standard tuning-fork controlled type, the output of which is fed into a one-stage amplifier shown at 40. The frequency and the voltage of the oscillator 38 are held fixed at all times. While the complete apparatus may be designed to use any frequency in a large range of frequency, a typical frequency would be 125 cycles per second, corresponding to a 250 cycle vibration of the reed which, of course, is itself designed to have a natural resonance frequency of 250 cycles.

The oscillator output is applied across a resistor 42 in the grid circuit of the amplifier tube 44, and the output of the tube is fed through a transformer 46 to the magnet coil (not shown) through the wires 34. A voltmeter type instrument 48 is connected across the wires 34, and its scale may be marked in units of length.

The output of tube 44 is varied by means of a bias potentiometer 50, the drop across which is controlled by the nature of the engagement of the vibratile contacts connected to the wires 36.

More specifically, the D. C. source 52 causes a small charging pulse in the condenser 54 every time the contacts engage, and thus maintains a fixed potential across the condenser 54 for any percentage of contact time and depending, of course, on the magnitude of the bleeder resistance 56 relative to the capacitance of the condenser. When the contacts move toward one another the contact time interval increases, and the voltage across the condenser 54 rises, and thus supplies more negative bias to the grid of the amplifier tube 44. This reduces the energization of the electro magnet causing vibration of the reed, thereby reducing the amplitude of vibration and consequently reducing the duration of the contact time to approximately the original value.

If, on the other hand, the spacing between the contacts increases, the potential across the condenser 54 decreases, and the bias of amplifier tube 44 decreases, thereby increasing the excitation of the electro magnet, and so increasing the amplitude of vibration of the reed, and thereby again restoring the original duration of contact engagement.

Of course, these differences in excitation of the electro magnet are indicated on the sensitive voltmeter 48, the scale of which may be calibrated in terms of ten-thousandths of an inch, with the net result that the dimension being measured, in this case the depth of a hole, or more specifically deviations of depth from a desired value, may be read directly on the meter scale.

The potentiometer 58 shown in Fig. 4 duplicates somewhat the function of the potentiometer 50 in that it adjusts the amount of D. C. bias supplied to the amplifier 40. However, potentiometer 50 or 58 may be used alone as well as both, as here shown. When both are used there is a means to control the output of the contact circuit to come within a range for which the input of the amplifier circuit has been designed.

If desired the invention may be practiced in a somewhat simpler form requiring manual instead of automatic adjustment of voltage. In such case the apparatus may be set up to be equivalent to a "go" or a "no-go" gauge, and pieces may be tested by means of two instruments, one acting as a "go" and the other acting as a "no-go" gauge.

Thus referring to Fig. 9, the oscillator 38 is a fixed frequency, fixed voltage oscillator similar to that already described in connection with Fig. 4. Its output is similarly amplified in a one-stage amplifier centering about vacuum tube 60. Oscillator 38 is connected to potentiometer 62 in the grid circuit of tube 60, which also includes a series resistor 64. The output of tube 60 is coupled through a transformer 66 and through wires 68 to the magnet coil (not shown), across which a voltmeter 70 is connected. The output of tube 60 may be varied manually by means of the slidable contact arrangement shown schematically at 72.

Referring now to Fig. 8, the relatively vibratile contacts are connected to wires 74. As in the case of Fig. 4, the D. C. source 76 tends to charge a condenser 78, this charge rising to a voltage which depends on the percentage of contact time and the time constant of the R. C. circuit, that is, on the quantitative values of the condenser 78 and the resistor 80. A neon lamp 82 is connected across the condenser 78, and when the voltage exceeds that needed to fire the neon lamp the latter flashes on and stays on unless, of course, the adjustment at 72 is changed to reduce the excitation of the reed until the neon lamp is extinguished.

The reason this arrangement is referred to as a "go" or "no-go" gauge is that all values below a critical point will leave the lamp unlighted, and all values above the critical point will keep it lighted. Two such instruments may be set up, with one adjusted at a desired maximum limit, and another adjusted at a desired minimum limit. An operator testing a series of pieces may be instructed to accept or pass all pieces which do not light the lamp, and to reject all pieces which do (or vice versa). After two tests, one for maximum and one for minimum, the accepted pieces are known to lie between the tolerance limits.

Of course, in this case the meter 70 is not used by the operator and is not needed for the measurement. However, it is provided as a convenience in setting up the instrument, for the scale of the meter may be calibrated to read in increments of 0.0001", and thus a foreman or supervisory operator may properly adjust the instruments, and also see that they remain properly adjusted.

Figure 3:
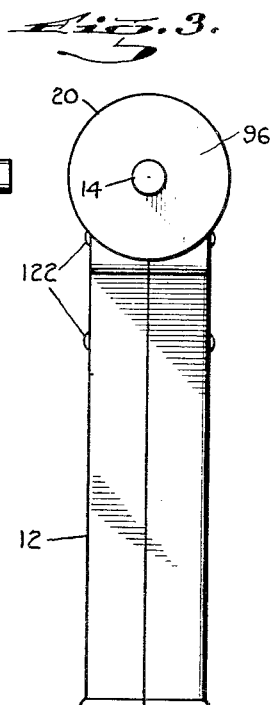
Fig. 3 is an end elevation of the same.

Reverting now to Figs. 1, 2 and 3 of the drawing, the structure there shown comprises a main frame piece 84 carrying a rod 86 which is stepped in diameter to provide a collar 88. The frame piece is a rigid solid block having nearly the thickness shown in Fig. 3. The rod 86 is normally urged to the right by a compression spring 90, but its movement is limited by a threaded bushing 92 screwed into the frame piece 84. The inward motion of the rod is limited by a shoulder or ledge 94 formed in block 84, and in practice the total range of movement permitted for rod 86 in some cases may be a matter of only 0.01".

The outer end of rod 86 is threaded to receive any one of a number of special rods or feelers 14 each dimensioned for a particular depth of hole being measured. The plate or disc 20 is itself threaded and received on the threaded outer end of the bushing 92 previously referred to. There is a known relation between the outer face 96 of the disc 20 and the end 98 of the rod 86, and this relation is kept in mind when determining the desired length for the rod 14.

The inner end of rod 86 carries an insulation plug 100, and contact 24 is mounted on the said plug. A flexible wire 102 is connected to contact 24.

The vibratile contact 26 is carried at the upper end of upper reed 28, which may be made of Phosphor bronze or like suitable material. This is physically connected at its lower end to a lower reed or ferrous spring 104, the lower end of which in turn is clamped by screws 106. The lower end of spring 104 is electrically connected to wire 108.

The magnetic or flux circuit comprises the core 110 of coil 32, and a stationary field piece 112. These are held together by the screws 106, but the mounting is preferably made an insulated one by use of insulation plates 114 and 116, and insulation sleeves 118 around the screws. The magnetic circuit is completed by an armature 120 which acts also to receive the screws which secure together the upper and lower parts 28 and 104 of the complete reed. A small air gap is left between the armature 120 and the stationary core piece 112, and the excitation of the reed is effectuated at this point.

It will be evident that the working parts are all mounted on the solid frame piece 84, and their physical relation is determined by the frame piece itself. It is merely for convenience that the parts are then housed in a housing 12, which may be made of sheet metal or die cast metal or molded plastic. It is formed in two halves which are assembled together in edge-to-edge relation, with the working parts of the gauge enclosed therebetween. The parts may be secured together by appropriate screws or rivets 122 passing through the instrument and serving to hold together the handle pieces 12 on opposite sides of and preferably against the block 84.

It will be understood that the apparatus may be used in other ways than as a depth gauge. In Fig. 5 I show a modification intended for outside measurement. The main difference is that the frame piece 84' is formed integrally and rigidly with a yoke 124. One end of the yoke carries a suitable adjustable anvil 126 with a lock nut 128. A movable member or plug 14' of suitable dimension may be added to the outer end of the rod 86, or the anvil 126 may be lengthened, and different anvils used. It will be evident that except for this change in the external physical structure, the operation will be the same as previously described, for any deviation in the diameter of the piece being measured will be transferred to the relatively movable contacts, and thus will be readable on a meter as shown at 48 in Fig. 4, or indicated in terms of "go" or "no-go," by means of a suitable indicator, typically a neon lamp, as shown at 82 in Fig. 8.

The instrument may also be adapted for inside measurement, and such an arrangement is shown in Fig. 6 of the drawing, a referring to which it will be seen that in this case the frame 84, and more specifically its bushing part 92', has been modified to include a generally cylindrical extension 130. This is slotted near its outer end to receive a small angle lever 132 pivoted at 134. The lever is normally turned clockwise by means of a small spring 136, but this spring is a light spring intended only to keep one arm of the angle lever in contact with the outer end of a rod 138 which forms an extension of the rod 86'. The angle lever is really turned counterclockwise by reason of the main compression spring 90 which urges the rod 86' outwardly. The other arm of the angle lever 132 is provided with a hardened ball tip 140. This may be a jewel such as a sapphire, or it may be glass, or other suitable hard material.

As here illustrated, the gauge is being used to measure the inside diameter of a hole 142 in a work piece 144. For this purpose the end of the gauge is pushed into the hole, and any deviation in diameter from the correct desired diameter will cause a displacement of the rod 86', and a consequent change at the relatively vibratile contacts. This deviation may be read quantitatively on a meter, as shown at 48 in Fig. 4, or may be determined in relation to "go" or "no-go" limits by means of an indicator, such as the neon lamp 82 shown in Fig. 8.

One of the features of the present invention which contributes greatly to its convenience when using a measuring scale on a meter, stems from the discovery that if the exciting frequency is in resonance with the natural resonance frequency of the reed, the amplitude of vibration is directly proportional to or in linear relation to the exciting current (or voltage). If the relation is not perfectly linear, it is substantially so, particularly when kept within the comparatively small limits of movement required for the present purpose. A result of this is that the dimensional scale on the meters 48 and 70 in Figs. 4 and 9 is linear or substantially linear. By substantially linear I mean that a linear scale may be used, and the error, if any, will be so small that it may be taken care of by a calibration curve, instead of by making a wholly special nonlinear scale for the meter.

It is believed that the construction and theory of operation of my improved vibrator gauge, as well as the method of using the same and the advantages thereof, will be apparent from the foregoing detailed description. It will also be apparent that while I have shown and described the invention in several preferred forms, changes may be made in the structures shown without departing from the scope of the invention, as sought to be defined in the following claims.

I claim:

1. A measuring gauge comprising a stationary part, and a movable part for measurement of the distance or space therebetween, a non-vibratile electrical contact carried by said movable part, a vibratile reed carrying a vibratile contact for cooperation with the aforesaid non-vibratile contact, an electromagnet for vibrating said reed, a source of alternating current for energizing said electromagnet, said source having a frequency equal to the natural resonance frequency of the reed, and circuitry connected to said contacts by means of which a change in the current flowing through the contacts is employed to automatically vary the current flowing from said source to the electromagnet so as to increase or decrease its magnetism, whichever will cause the intermittent current flowing through the contacts to tend to return to increments of approximately the original duration.

2. A gauge as defined in claim 1, in which the movable part is a rod having a free end, and the stationary part is a relatively extensive surface disposed near the base end of the rod, whereby the gauge may be used as a depth gauge.

3. A gauge as defined in claim 1, in which the stationary part is carried at one end of a rigid U-shaped yoke, and the movable part is carried at the other end of said yoke in alignment with said stationary part, whereby the gauge may be used as an outside diameter gauge.

4. A gauge as defined in claim 1, in which the stationary part carries an angle lever one arm of which acts as a movable part and the other arm of which cooperates with a movable part carrying the non-vibratable contact, whereby the gauge may be used as an inside diameter gauge.

5. A gauge as defined in claim 1, including also a meter responsive to the potential across or current through the electromagnet, manually operable means for varying the potential and current, and an indicator in the circuit which includes the aforesaid contacts for indicating whether the measurement comes on one side or the other of an end limit to provide a go or no-go indication.

6. A measuring gauge comprising a stationary part, and a movable part for measurement of the distance or space therebetween, a non-vibratile electrical contact carried by said movable part, a vibratile reed carrying a vibratile contact for cooperation with the aforesaid non-vibratile contact, an electromagnet for vibrating said reed, a source of alternating current for energizing said electromagnet, said source having a frequency equal to the natural resonance frequency of the reed, and circuitry connected to said contacts by means of which a change in the current flowing through the contacts is employed to automatically vary the current flowing from said source to the electromagnet so as to increase or decrease its magnetism, whichever will cause the intermittent current flowing through the contacts to tend to return to increments of approximately the original duration, and a meter having a distance scale and so connected in said circuitry as to operate in dependence on the aforesaid current flowing to the electromagnet.

7. A gauge as defined in claim 6, in which the movable part is a rod having a free end, and the stationary part is a relatively extensive surface disposed near the base end of the rod, whereby the gauge may be used as a depth gauge.

8. A gauge as defined in claim 6, in which the stationary part is carried at one end of a rigid U-shaped yoke, and the movable part is carried at the other end of said yoke in alignment with said stationary part, whereby the gauge may be used as an outside diameter gauge.

9. A gauge as defined in claim 6, in which the stationary part carries an angle lever one arm of which acts as a movable part and the other arm of which cooperates with a movable part carrying the non-vibratable contact, whereby the gauge may be used as an inside diameter gauge.

References Cited in the file of this patent

UNITED STATES PATENTS

| 2,073,913 | Wignan | Mar. 16, 1937 |
| 2,217,509 | Bryant | Oct. 8, 1940 |
| 2,324,998 | Dague | July 20, 1943 |
| 2,554,271 | Slepian | May 22, 1951 |
| 2,581,473 | Eisele | June 8, 1952 |
| 2,618,861 | Cattee | Nov. 25, 1952 |

FOREIGN PATENTS

| 635,633 | Great Britain | July 12, 1948 |